United States Patent [19]

Kim

[11] Patent Number: 5,855,810
[45] Date of Patent: Jan. 5, 1999

[54] SOFT FERRITE MATERIAL FOR USE IN MAKING INDUCTORS, AND METHOD FOR MANUFACTURING INDUCTORS USING THE MATERIAL

[75] Inventor: Chang Sik Kim, Suwon, Rep. of Korea

[73] Assignee: Samsung Electro-Mechanics Co., Ltd., Kyongki-do, Rep. of Korea

[21] Appl. No.: 879,047

[22] Filed: Jun. 19, 1997

[30] Foreign Application Priority Data

Nov. 30, 1996 [KR] Rep. of Korea .................. 1996-60293

[51] Int. Cl.$^6$ ............................ C04B 35/28; H01F 1/113; H01F 1/37
[52] U.S. Cl. ........................ 252/62.6; 252/62.62; 501/32; 501/49; 501/79
[58] Field of Search ................................ 252/62.6, 62.62; 501/32, 49, 79

[56] References Cited

U.S. PATENT DOCUMENTS

| | | | |
|---|---|---|---|
| 2,685,568 | 8/1954 | Wilson | 252/62.6 |
| 4,741,849 | 5/1988 | Naito et al. | 501/32 |
| 5,252,521 | 10/1993 | Robets | 501/17 |

*Primary Examiner*—Melissa Bonner
*Attorney, Agent, or Firm*—Lowe Hauptman Gopstein Gilman & Berner

[57] ABSTRACT

A soft ferrite material for manufacturing a device for shielding electromagnetic frequencies such as wire coiling inductors and chip components including chip inductors and chip beads is disclosed. Particularly, an Ni—Cu—An soft ferrite material and a method for manufacturing a wire coiling type or chip type inductor using the ferrite material are disclosed, in which a low temperature sintering is possible, the variations of the electromagnetic properties are low as against an external stress, and the electromagnetic properties are superior. A $B_2O_3$—$Bi_2O_3$—ZnO glass is added in an amount of 0.05–15.0 wt % to the ordinary Ni—Cu—Zn soft raw material, and this mixture is sintered at a temperature of 860°–910° C.

23 Claims, No Drawings

SOFT FERRITE MATERIAL FOR USE IN MAKING INDUCTORS, AND METHOD FOR MANUFACTURING INDUCTORS USING THE MATERIAL

BACKGROUND OF THE INVENTION

1. Field of the Invention

The present invention relates to a soft ferrite material for manufacturing devices for shielding electromagnetic frequencies such as wire coiling inductors and chip components including chip inductors and chip beads. The present invention also relates to a method for manufacturing an inductor by using the ferrite material. More specifically, the present invention relates to a Ni—Cu—Zn soft ferrite material and a method for manufacturing a wire coiling type or chip type inductor using the ferrite material, whereto low temperature sintering is possible, the variations of the electromagnetic properties are low as against an external stress, and the electromagnetic properties are superior.

2. Description of the Prior Art

Recent progress in the manufacte of electronic and communication apparatus has led to the production of miniaturized thin and easily installable electronic components, resulting in a new industrial structure which gave rise to new problems such as environmental pollution and communication interferences, which could previously be disregarded. Due the proliferation of wireless communication apparatuses and the multi-tech environment, the electromagnetic environment has been aggravated. Accordingly, the nations of the world came to reinforce the electromagnetic impediment regulations (FCC, CISPR, VDE, MIL).

Therefore, electromagnetic wave impediment removing devices (EMI/EMC) are in demand. Consequently, the demand for electronic components has increased, and the current technical trend takes an orientation toward diversification of the functions, the increase of density, and high efficiencies.

Further, the application of the soft ferrite material for use in making electronic components such as electromagnetic impediment eliminating devices and power transmission devices has been finely divided based on characteristics, frequency bands and the like.

In the manufacturing method also, a departure from the conventional powder metallurgical method was observed, and stacked type components are briskly studied and have been put to practical uses. This method has settled in the technical field of the small chip components such as ceramic electronic components as a major part.

Generally, the soft ferrite material which is used in manufacturing small chip components such as chip inductors, chip beads, chip arrays, chip LC filters and chip trans requires a high inductance. This soft ferrite material includes the Mn—Zn ferrite, Ni ferrite, Ni—Zn ferrite and Ni—Cu—Zn ferrite.

The Mn—Zn ferrite has a high permeability, and shows a low power loss. Therefore, it is used as the magnetic core for power supply transformers power line filters and the like. However, the Mn—Zn ferrite shows a low radio frequency characteristic, and therefore, it cannot be applied to a frequency band of over 1 MHz. At present, the magnetic core materials which are usable in the frequency band of over 1 MHz are Ni ferrite, Ni—Zn ferrite, and Ni—Cu—Zn ferrite.

Meanwhile, the conventional manufacturing method for the soft ferrite material is carried out in the following manner. That is, a sintering process is conducted at a temperature of 1000°–1400° C. for 1–5 hours. However, the inner electrodes of the electronic components such as the chip inductor and the chip bead filter are made of silver (Ag). The above described sintering temperature exceeds the melting point of Ag (960° C.). Therefore, not only is the sintering temperature too high, but also the manufactured components show much loss at the general frequency band of 500 KHz–20 MHz. The required inductance cannot be met. In order to lower the sintering temperature for the soft ferrite material, generally the particle size of the magnetic core material is finely crushed to 0.01–1 $\mu$m. Thus the energy level of the particles is made to reach the ground state (metastable state), and the material moving space between the particles is made to be increased during sintering so as to promote low temperature sintering.

However, the manufacturing method resorting to fine crushing requires expensive facilities and a complicated process, with the result that the manufacturing cost is increased. Further, there is a problem in putting the process to practical use.

As another example, there is a method in which an ingredient such as $B_2O_3$ is used (Japanese Patent Application Laid-open No. Sho-64-45771). There is still another method in which sintering is carried out by adding a flux such as ZnO or $V_2O_5$ so as to induce a surface spread of the particles (Japanese Patent Application Laid-open No. Sho-60-210572).

However, in the method in which the low melting point compound is added, the behavior of the Co component for improving the frequency characteristics is impeded, thereby lowering the sintering effect. Further, in this method, the additives exist in the liquid phase at a temperature lower than the sintering temperature of the soft ferrite material as the matrix. Therefore, the additives are spread on the grain boundaries to promote sintering. Due to the segregation of the additives, an inductance drop and loss occurs. Further, they interact with the inner electrode made of Ag, or are spread on the Ag electrode. Consequently, the magnetic properties (inductance, Q-factor) of the chip inductor are degraded, with the result that product reliability deteriorates.

SUMMARY OF THE INVENTION

The present invention is intended to overcome the above described disadvantages of the conventional techniques.

Therefore it is an object of the present invention to provide an Ni—Cu—Zn soft ferrite material in which there are added composite glass powders exhibiting minimum deterioration of the electromagnetic properties even after reaction with the main ingredient of the matrix, and showing no interaction with the inner Ag electrode, so that the stability of the inner electrode can be ensured at a low sintering temperature, and that superior characteristics can be ensured at a frequency band of 500 KHz–20 MHz.

It is another object of the present invention to provide a method for manufacturing wire coiling inductors and chip inductors at a low sintering temperature by using the Ni—Cu—Zn soft ferrite material.

In achieving the above objects, the Ni—Cu—Zn soft ferrite material for making inductors according to the present invention includes a raw material composed of (in mole %): 49.0–50.0% of $Fe_2O_3$, 5–13% of CuO, 7.5–25% of NiO, and 12–38.5% of ZnO, and the soft ferrite material further includes (in weight %): 0.05–15.0% of $B_2O_3$—$Bi_2O_3$—ZnO glass.

In another aspect of the present invention, the Ni—Cu—Zn soft ferrite material for making inductors according to the present invention includes a raw material composed of (in mole %): 49.0–50.0% of $Fe_2O_3$, 5–13% of CuO, 7.5–25% of NiO, and 12–38.5% of ZnO, and the soft ferrite material further includes (in weight %): one compound or more selected from a group consisting of 2.0% or less of CoO, 2.0% or less of $Co_2O_3$ and 2.0% or less of $Co_3O_4$; and 0.05–15.0% of $B_2O_3$—$Bi_2O_3$—ZnO glass.

In still another aspect of the present invention, the method for manufacturing a wire coiling inductor according to the present invention includes the steps of:

adding 0.05–15.0 wt % of $B_2O_3$—$Bi_2O_3$—ZnO glass to a raw material composed of (in mole %): 49.0–50.0% of $Fe_2O_3$, 5–13% of CuO, 7.5–25% of NiO, and 12–38.5% of ZnO, and crushing and drying them to form a dried powder;

mixing the dried powder with 5–15 wt % of a binder containing 5–10 wt % of a main agent and 5–16 wt % of a reaction inhibiting agent therein, and making coarse particles from the mixture; and by using forming by using the coarse particles, and sintering the resulting body at a temperature of 860°–910° C.

In still another aspect of the present invention, the method for manufacturing a wire coiling inductor according to the present invention includes the steps of:

adding 0.05–15.0% of $B_2O_3$—$Bi_2O_3$—ZnO glass to a ferrite powder composed of (in mole %): 49.0–50.0% of $Fe_2O_3$, 5–13% of CuO, 7.5–25% of NiO, and 12–38.5% of ZnO, and crushing and drying them to form a dried powder;

mixing the dried powder with one compound or more selected from a group consisting of (in weight %): 2.0% or less of CoO, 2.0% or less of $Co_2O_3$ and 2.0% or less of $Co_3O_4$, and calcinating the mixture;

mixing the calcinated powder with 5–15 wt % of a binder containing 5–10 wt % of a main agent and 5–16 wt % of a reaction inhibiting agent therein, and making coarse particles from the mixture; and by using forming by using the coarse particles, and sintering the resulting body at a temperature of 860°–910° C.

In still another aspect of the present invention, the method for manufacturing a chip inductor according to the present invention includes the steps of:

adding 0.05–15.0% of $B_2O_3$—$Bi_2O_3$—ZnO glass to a ferrite powder composed of (in mole %): 49.0–50.0% of $Fe_2O_3$, 5–13% of CuO, 7.5–25% of NiO, and 12–38.5% of ZnO, and crushing and drying them to form a dried powder;

adding a binder to the dried powder at a ratio of 1:1–1:4, and casting a plurality of green sheets using a doctor blade process;

stacking a plurality of the green sheets, printing an inner Ag electrode upon the stacked sheets, restocking the green sheets, carrying out sintering and forming an outer electrode on the sintered body.

In still another aspect of the present invention, the method for manufacturing a chip inductor according to the present invention includes the steps of:

mixing a raw material composed of (in mole %): 49.0–50.0% of $Fe_2O_3$, 5–13% of CuO, 7.5–25% of NiO, and 12–38.5% of ZnO, with one compound or more selected from a group consisting of (in weight %): 2.0% or less of CoO, 2.0% or less of $Co_2O_3$ and 2.0% or less of $Co_3O_4$; and 0.05–15.0% of $B_2O_3$—$Bi_2O_3$—ZnO glass, and crushing and drying them to form a dried powder;

adding a binder to the dried powder at a ratio of 1:1–1:4, and casting a plurality of green sheets using a doctor blade process;

stacking a plurality of the green sheets, printing an inner Ag electrode upon the stacked sheets, restacking the green sheets, and carrying out sintering at a temperature of 880°–910° C. for less than 5 hours (1–3 hours, for example), with a temperature increase from 750° C. to 900° C. at 10° C./minute or less, followed by cooling down from 900° to 700° at a rate of about 5° C./minute or less; and forming an outer electrode on the sintered body.

DESCRIPTION OF THE PREFERRED EMBODIMENT

Generally, soft ferrite materials are different in characteristics versus frequency bands depending on the structure and composition. The present invention provides a Ni—Cu—Zn soft magnetic ferrite in which the ZnO ingredient is high and the NiO ingredient is low in relative terms, which is suitable for a frequency band of 500 KHz–20 MHz. The basic composition preferably is a raw material composed of (in mole %): 49.0–50.0% of $Fe_2O_3$, 5–13% of CuO, 7.5–25% of NiO, and 12–38.5% of ZnO. More preferably, the composition further includes one compound selected from a group consisting of 2.0% each of CoO, $Co_2O_3$, and $Co_3O_4$.

Further, in the present invention, a $B_2O_3$—$Bi_2O_3$—ZnO glass is added in an amount of 0.05–15.0 wt % to the above described mixture.

The addition of the above mentioned glass advantageously minimizes degradation of the electromagnetic properties can even after reaction with the soft magnetic matrix. Advantageously, in the case of a chip inductor, no reaction occurs with an inner electrode made of Ag, and sintering temperature is lowered.

If the glass is added in an amount of 0.05–15.0 wt %, the sintering temperature for the matrix can be brought down from the conventional temperature of 1000°–1350° C. (which is the sintering temperature for the case where the conventional low melting point compound ($Bi_2O_3$ or $V_2O_5$) is used) to 860°–910° C. Further, in this case, the stress which occurs during shrinkage of the matrix and the inner electrode after sintering can be reduced, so that the inner electrode can be made stable. The glass should be preferably included in amounts of 10–40 wt % of $B_2O_3$, 20–40 wt % of $Bi_2O_3$ and 20–70 wt % of ZnO. When a wire coiling inductor is made using the soft ferrite material according to the present invention, the behavior of the glass within the matrix raises the sintered density of the matrix. Consequently, mechanical strength improves and, due to the high surface denseness, adherence of foreign materials is inhibited during the electroplating thereby improving the manufacturing yield.

Meanwhile, in the case of the inductor which is manufactured by using the soft ferrite material according to the present invention, the particle size of the added glass should be preferably 0.1–10 μm. More preferably, in order to prevent the growth of large grains due to the deviated distribution of the matrix, the particle size of the glass should be 0.2–5 μm.

The method for manufacturing a wire coiling inductor by using the dried powder containing the glass according to the present invention will now be described.

In the case of the wire coiling inductor, after drying the powder containing the glass, immediately 5–15 wt % of a binder with 5–10 wt % of a main ingredient and 5–16 wt % of a reaction inhibiting agent contained therein is added, and then, coarse particles are formed. The main ingredient may be any usual material which is usually used when manufacturing a sintered core. For example, polyvinyl alcohol(PVA) or methyl cellulose may be used. Meanwhile, the reaction inhibiting agent plays the role of preventing the agglomeration of the soft magnetic particles, and this material may be mannitol or propylene glycol (PEG).

The dried powder may be calcinated as in the usual case, and the calcination temperature should be preferably 650°–880° C. More preferably the calcination temperature should be 700°–850° C.

The calcinated powder is then made into coarse particles, which are formed to produce a desired fabricated body. The fabricated body is sintered at a temperature of 860°–910° C. which is a temperature much lower than that of the usual case in which the usual low melting point compound is contained. During the sintering, temperature interval of 750°–900° C. allows the grains to be aligned and made dense. Therefore, if the temperature is raised abruptly, pores or cavities may be formed, with the result that permeability is lowered and the quality factor degraded. Therefore, it is preferred that an abrupt temperature increase be avoided. For example, in the above mentioned temperature interval, the temperature raising should be preferably done at a rate of about 10° C./minute.

Further, after attaining the sintering temperature, the sintering temperature is maintained preferably for 2–3 hours. During the cooling interval down to 700° C., abrupt cooling is avoided. If abrupt cooling occurs during this interval, the CuO component is precipitated from the matrix with the result that the electromagnetic properties are degraded. Therefore, care should be exercised and, during this cooling interval, the cooling rate should be preferably 5° C./minute or less.

The present invention permits, the microstructure to become stabilized, and the following properties are obtained. That is, the quality factor is 150 or more, the peak region is 100 KHz–20 MHz, and the inductance is 10 $\mu$H or more. Thus a soft ferrite material having superior electromagnetic properties can be obtained at a low temperature compared with the conventional technique.

The method for manufacturing a chip inductor by using a dried powder with the above mentioned glass added therein will now be described.

A binder in the form of an organic high molecule such as PVB, methyl cellulose (MC), oleic acid, propylene glycol, toluene or mannitol is added to the dried powder at a ratio of 1:1–1:4. Green sheets are then cast using the doctor blade process, and then, a plurality of the green sheets are stacked. An inner Ag electrode is then printed and then plurality of green sheets are again stacked. This structure is sintered at a temperature of 880°–910° C. The sintering temperature of 880°–910° C. is a level much lower than the conventional level. An outer electrode is formed on the sintered body, thereby obtaining the chip inductor according to the present invention.

The present invention will now be described based on actual examples.

<EXAMPLE 1>

Raw materials were measured into the compositions of Table 1 below. These raw materials were put into a polyurethane jar and then crushed and mixed after adding distilled water at a ratio of 1–3 times the amount of the raw materials and by using YTZ-balls ($Y_2O_3$-zirconia balls) until the average particle size became 1–1.5 $\mu$m. After completion of the mixing the powder was dried, and calcination occurred at a temperature of 700°–850° C. for 2–3 hours. The material was then recrushing within the same jar. During recrushing, a $10B_2O_3$—$65Bi_2O_3$—$25ZnO$ glass powder was added to the calcinated powder, and recrushing was performed 24–48 hours. When the particle size was reduced to 0.1–1.5 $\mu$m, drying was preformed with a drying machine until the moisture content reduced to 0.2–0.7% per weight unit of the raw materials.

The dried powder was sorted into uniform particle sizes of 60–80 meshes and then 5–15 wt % of a binder was added in which 5–10 wt % of polyvinyl alcohol(PVA) and 5–16 wt % of mannitol were dissolved. The powder was then sorted into a uniform particle size using a 50-mesh sieve and was fabricated into a toroidal core having an outside diameter of 25 mm, an inside diameter of 18 mm and a height of 4.5 mm. The fabricated structure was then sintered. During sintering, the temperature was raised at a rate of about 2° C./minute up to 420° C., and this temperature was maintained for about 4 hours, thereby carrying out a debindering.

During temperature increase to 750° C., the temperature was raised at a rate of about 3° C./minute, and then, up to a temperature of 900° C., the temperature raising was carried out at a rate of about 1° C./minute. The temperature of 900° C. was maintained for 2–3 hours and then cooling occurred at a rate of about 3° C./minute down to 700° C. then at a rate of 10° C./minute down to room temperature.

An enameled copper wire having a diameter of 0.55 mm was wound onto the sintered structure by 20 turns. Then the inductance and the quality factor (Q-factor) were measured at a frequency band of 10 KHz–40 MHz by using an HP4291A network analyzer. The results are shown in Table 1 below.

In Table 1 below, for the conventional example, a sintering was carried out at a temperature of about 950° C.

TABLE 1

| | Chemical composition | | | | | | | | | | Inductance | Q |
| | Main ingredient (mole %) | | | | Additives (wt %) | | | | | | |
| Example | $Fe_2O_3$ | NiO | ZnO | CuO | CoO | $Co_2O_3$ | $CO_3O_4$ | Glass | $Bi_2O_3$ | $V_2O_5$ | ($\mu$H) | peak |
| --- | --- | --- | --- | --- | --- | --- | --- | --- | --- | --- | --- | --- |
| Inventive Example 1 | 49.5 | 10.1 | 31.35 | 8.85 | — | 0.4 | — | 1.5 | — | — | 19.0 | 155 |
| Inventive Example 2 | 49.5 | 10.1 | 31.35 | 8.85 | — | 0.5 | — | 2.0 | — | — | 21.6 | 188 |
| Inventive Example 3 | 49.75 | 14.47 | 30.75 | 5.03 | — | 0.5 | — | 2.0 | — | — | 15.0 | 158 |
| Inventive Example 4 | 49.75 | 11.51 | 32.71 | 6.03 | — | 0.5 | — | 2.0 | — | — | 15.8 | 163 |
| Inventive | 49.5 | 10.0 | 30.5 | 10.0 | — | 0.5 | — | 1.0 | — | — | 18.0 | 171 |

TABLE 1-continued

| | Chemical composition | | | | | | | | | | | |
|---|---|---|---|---|---|---|---|---|---|---|---|---|
| | Main ingredient (mole %) | | | | Additives (wt %) | | | | | | Inductance | Q |
| Example | $Fe_2O_3$ | NiO | ZnO | CuO | CoO | $Co_2O_3$ | $CO_3O_4$ | Glass | $Bi_2O_3$ | $V_2O_5$ | ($\mu$H) | peak |
| Example 5 Inventive | 49.5 | 7.5 | 30.5 | 12.5 | — | 0.1 | — | 0.5 | — | — | 24.2 | 152 |
| Example 6 Inventive | 49.5 | 17.5 | 23.0 | 10.0 | — | 0.5 | — | 2.0 | — | — | 15.0 | 240 |
| Example 7 Inventive | 49.5 | 15.15 | 25.25 | 10.1 | — | 0.5 | — | 2.0 | — | — | 22.9 | 225 |
| Example 8 Inventive | 49.5 | 15.15 | 25.25 | 10.0 | — | 0.5 | — | 1.5 | — | — | 20.9 | 232 |
| Example 9 Comparative | 49.75 | 15.15 | 34.22 | 4.02 | — | 0.5 | — | 2.0 | — | — | 18.0 | 78 |
| Example 1 Comparative | 49.5 | 15.15 | 25.25 | 10.1 | 0.3 | 0.2 | — | — | 0.75 | — | 12.4 | 142 |
| Example 2 Comparative | 49.5 | 15.15 | 25.25 | 10.1 | — | — | 0.5 | — | 0.5 | — | 13.5 | 149 |
| Example 3 Comparative | 49.5 | 15.15 | 25.25 | 10.1 | — | 0.5 | — | — | — | 0.65 | 24.2 | 132 |
| Example 4 Comparative | 49.5 | 15.15 | 25.25 | 10.1 | 0.3 | — | 0.2 | — | 0.65 | — | 12.0 | 141 |
| Example 5 Comparative | 49.5 | 15.15 | 25.25 | 10.1 | — | 0.3 | 0.2 | — | 1.0 | — | 19.0 | 145 |
| Example 6 Conventional Example | 49.5 | 15.15 | 25.25 | 10.1 | — | — | — | — | — | — | 48.5 | 92 |

As shown in Table 1 above, in Inventive Examples 1–9 in which the conditions of the present invention were satisfied, it was confirmed that low temperature sintering was possible. Further, the inductance value was more than 10 $\mu$H, and the quality factor Q was about 150 exhibiting superior electromagnetic properties. That is, such properties of the material of the present invention made it possible to conduct sintering at a much lowerer temperature, i.e. by 50°–100° C. Further, the loss after sintering was much lower.

In the case of Comparative Examples 2–6, a $Bi_2O_3$ or $V_2O_5$ additive was added instead of the glass. Therefore, sintering was not sufficiently carried out at the low temperature and the resulting product exhibited low quality and low inductance. The reason is that grain boundary diffusion cannot occur with only the $Bi_2O_3$ or $V_2O_5$ component. In the case of Comparative Example 1 in which the compositions depart basically from that of the present invention, the quality factor was too low due to the low temperature sintering, and therefore, the electromagnetic properties were degraded.

<EXAMPLE 2>

In order to see the electromagnetic properties versus the kinds of the glass, glasses having different physical properties as shown in Table 2 below were added to the raw materials having the same composition as in Example 1. The respective materials were then fabricated into toroidal bodies and sintered, the electromagnetic properties were measured, and the results are shown in Table 3 below. Before the measurements, an enameled copper wire having a diameter of 0.55 mm was wound on the toroidal body by 20 turns, and then, the measurement was carried out by using an HP4194A impedance analyzer.

TABLE 2

| | Ingredient(wt %) | | | | | Thermal expansion | Density | Particle Size | Softening | Melting temp. |
|---|---|---|---|---|---|---|---|---|---|---|
| | $B_2O_3$ | $Bi_2O_3$ | ZnO | $SiO_2$ | Na | ($10^{-7}$/°C.) | (g/cc) | ($\mu$m) | point(°C.) | (°C.) |
| Inventive material a | 10 | 65 | 25 | — | — | 75.3 | 5.60 | 1.18 | 522 | 900 |
| Inventive material b | 15 | 65 | 20 | — | — | 69.0 | 5.01 | 7.10 | 452 | 900 |
| Inventive material c | 10 | 55 | 35 | — | — | 71.0 | 4.90 | 5.30 | 464 | 900 |
| Inventive material d | 10 | 60 | 30 | — | — | 78.6 | 5.95 | 1.30 | 502 | 870 |
| Inventive material e | 20 | 60 | 20 | — | — | 88.0 | 2.62 | 4.52 | 505 | 825 |
| Comparative material A | 20 | — | — | 80 | — | 23.0 | 2.14 | 3.70 | 485 | 1300 |
| Comparative material B | 15 | — | — | 60 | 25 | 84.0 | 3.06 | 5.20 | 486 | 700 |
| Comparative material C | 20 | — | — | 50 | 30 | 64.5 | 2.70 | 4.30 | 491 | 767 |

TABLE 3

| Example | Glass | Main ingredient (mole %) | | | | Additives (wt %) | | | Inductance ($\mu$H) | Q | |
|---|---|---|---|---|---|---|---|---|---|---|---|
| | | $Fe_2O_3$ | NiO | ZnO | CuO | $CO_2O_3$ | $Co_3O_4$ | Glass | | Qp | Qf(KHz) |
| Inventive Example 8 | a | 49.5 | 15.15 | 25.25 | 10.1 | 0.5 | — | 2.0 | 22.9 | 225 | 400 |
| Inventive Example 10 | a | 49.5 | 15.15 | 25.25 | 10.1 | — | 0.5 | 2.0 | 18.7 | 214 | 420 |
| Inventive Example 11 | b | 49.5 | 15.15 | 25.25 | 10.1 | 0.5 | — | 2.0 | 22.9 | 215 | 380 |
| Inventive Example 12 | c | 49.5 | 15.15 | 25.25 | 10.1 | 0.5 | — | 2.0 | 16.5 | 195 | 450 |
| Inventive Example 13 | d | 49.5 | 15.15 | 25.25 | 10.1 | 0.5 | — | 2.0 | 22.5 | 252 | 380 |
| Inventive Example 14 | d | 49.5 | 15.15 | 25.25 | 10.1 | — | 0.5 | 2.0 | 20.9 | 222 | 420 |
| Inventive Example 15 | e | 49.5 | 15.15 | 25.25 | 10.1 | 0.5 | — | 2.0 | 17.6 | 179 | 450 |
| Comparative Example 7 | A | 49.5 | 15.15 | 25.25 | 10.1 | 0.5 | — | 2.0 | 12.1 | 162 | 1210 |
| Comparative Example 8 | B | 49.5 | 15.15 | 25.25 | 10.1 | 0.5 | — | 2.0 | 15.8 | 143 | 880 |
| Comparative Example 9 | C | 49.5 | 15.15 | 25.25 | 10.1 | 0.5 | — | 2.0 | 13.8 | 152 | 900 |

Referring to Tables 2 and 3, it can be seen that the electromagnetic properties of the manufactured soft ferrite material varied greatly in accordance with the variation of the composition of the glass which causes the deformation temperature point and the thermal expansion of the glass to be made different. That is, in the cases of Inventive Examples 8, and 10–15 in which Inventive Materials a–d were used, and in which the glass was composed of 10–40% of $B_2O_3$, 20–70% of $Bi_2O_3$ and 20–40% of ZnO to meet the conditions of the present invention, the inductance value at the commercial frequency was 15 $\mu$H or more, the quality factor was 150 or more, and the quality factor peak band (Q peak band) was 100 KHz–20 MHz each example.

On the other hand, in Comparative Examples 7–9 in which the $B_2O_3$—$SiO_2$ glasses (Comparative Materials A–C) were used, either the inductance value was too small or the quality factor was too small, thereby aggravating the electromagnetic properties.

<EXAMPLE 3>

The materials having the compositions of Table 1 were made into powders by applying the method of Example 1. A PVB-mannitol binder was then added at a ratio of 1:1–1:4. The mixture was sorted into uniform particles by using a 200–325-mesh sieve. Green sheets having a thickness of 10–200 $\mu$m were cast using the doctor blade process.

A plurality of the cast green sheets were stacked, an inner Ag electrode was printed on the stacked sheets, and the green sheets were stacked again. Sintering was conducted at a temperature of 880°–910° C. for 1–3 hours. An outer electrode was then formed on the sintered body, thereby completing a chip inductor. For a plurality of the chip inductors manufactured in this manner, the electromagnetic properties were measured by using an HP4192A network analyzer, and the measured results are shown in Table 4 below.

TABLE 4

| Example | Main ingredient (mole %) | | | | Additives (wt %) | | | | | | Inductance ($\mu$H) | Q peak |
|---|---|---|---|---|---|---|---|---|---|---|---|---|
| | $Fe_2O_3$ | NiO | ZnO | CuO | CoO | $Co_2O_3$ | $Co_3O_4$ | Glass | $Bi_2O_3$ | $V_2O_5$ | | |
| Inventive example 16 | 49.5 | 10.1 | 31.35 | 8.85 | — | 0.4 | — | 1.5 | — | — | 210 | 45 |
| Inventive example 17 | 49.5 | 10.1 | 31.35 | 8.85 | — | 0.5 | — | 2.0 | — | — | 240 | 59 |
| Inventive example 18 | 49.75 | 14.47 | 30.75 | 5.03 | — | 0.5 | — | 2.0 | — | — | 140 | 42 |
| Inventive example 19 | 49.75 | 11.51 | 32.71 | 6.03 | — | 0.5 | — | 2.0 | — | — | 155 | 53 |
| Inventive example 20 | 49.5 | 10.0 | 30.5 | 10.0 | — | 0.5 | — | 1.0 | — | — | 210 | 61 |
| Inventive example 21 | 49.5 | 7.5 | 30.5 | 12.5 | — | 0.1 | — | 0.5 | — | — | 340 | 39 |
| Inventive example 22 | 49.5 | 17.5 | 23.0 | 10.0 | — | 0.5 | — | 2.0 | — | — | 164 | 65 |

As shown in Table 4 above, in the cases of Inventive Examples 16–22 which satisfy the conditions of the present invention, low temperature sintering was possible. Further, the inductance value of the soft ferrite material after sintering was more than 140 nH, and the quality factor Q was 34 or more. Thus it was confirmed that they had superior electromagnetic properties. That is, the chip inductor of the present invention showed advantages compared with the conventional chip inductor in which the glass and the Co additives were not added at all. That is, in the present invention, the sintering temperature was lower by 50°–100° C., and loss after sintering was significantly low.

According to the present invention as described above, the sintering is sufficiently proceeded even at a low temperature, so that a soft ferrite material having superior electromagnetic properties can be obtained. Further, in manufacturing this material, the existing facilities can be used as they are. Therefore, an investment in expensive facilities becomes needless, and the difficulties in managing such facilities can be avoided. Accordingly, the soft ferrite material for chip inductors can be manufactured at a cheap cost.

What is claimed is:

1. An Ni—Cu—Zn soft ferrite material for making inductors, comprising a raw material composed of (in mole %): 49.0–50.0% of $Fe_2O_3$, 5–13% of CuO, 7.5–25% of NiO, and 12–38.5% of ZnO, and the soft ferrite material further comprising in weight %: 0.05–15.0% of $B_2O_3$—$Bi_2O_3$—ZnO glass.

2. The Ni—Cu—Zn soft ferrite material as claimed in claim 1, further comprising (in weight %): one compound or more selected from a group consisting of 2.0% or less of CoO, 2.0% or less of $Co_2O_3$ and 2.0% or less of $Co_3O_4$.

3. The Ni—Cu—Zn soft ferrite material as claimed in claim 1, wherein said glass is composed of (in weight %): 10–40% of $B_2O_3$, 20–40% of $Bi_2O_3$ and 20–70% of ZnO.

4. A method for manufacturing a wire coiling inductor core, comprising the steps of:

adding 0.05–15.0 wt % of $B_2O_3$—$Bi_2O_3$—ZnO glass to a raw material composed of (in mole %): 49.0–50.0% of $Fe_2O_3$, 5–13% of CuO, 7.5–25% of NiO, and 12–38.5% of ZnO, adding a liquid component and crushing and drying them to form a dried powder;

mixing said dried powder with 5–15 wt % of a binder containing 5–10 wt % of a main agent and 5–16 wt % of a reaction inhibiting agent therein, to form a mixture, and making coarse particles from the mixture; and forming the coarse particles, and sintering the resulting body at a temperature of 860°–910° C.

5. The method as claimed in claim 4, wherein said ferrite powder further comprises (in weight %): one compound or more selected from a group consisting of 2.0% or less of CoO, 2.0% or less of $Co_2O_3$ and 2.0% or less of $Co_3O_4$.

6. The method as claimed in claim 4, wherein said glass is composed of (in weight %): 10–40% of B, 20–40% of Bi and 20–70% of Zn.

7. The method as claimed in claim 6, wherein said glass has a particle size range of 0.1–10 μm.

8. The method as claimed in claim 7, wherein said glass has a particle size range of 0.2–5 μm.

9. The method as claimed in claim 4, wherein said powder is calcinated at a temperature of 650°–880° C.

10. The method as claimed in claim 4, wherein said sintering temperature is maintained for less than 5 hours.

11. The method as claimed in claim 4, wherein, during the sintering, a temperature raising is carried out through a temperature interval of 750°–900° C. at a rate of about 10° C./minute or less, and a cooling from 900° C. to 700° C. is carried out at a rate of about 5° C./minute or less.

12. The method as claimed in claim 4, wherein said main agent is polyvinyl alcohol or methyl cellulose.

13. The method as claimed in claim 4, wherein said reaction inhibiting agent is mannitol or propylene glycol.

14. A method for manufacturing a chip inductor, comprising the steps of:

adding 0.05–15.0 wt % of $B_2O_3$—$Bi_2$—$O_3$—ZnO glass to a raw material composed of (in mole %): 49.0–50.0% of $Fe_2O_3$, 5–13% of CuO, 7.5–25% of NiO, and 12–38.5% of ZnO, adding a liquid component and crushing and drying them to form a dried powder;

adding a binder to the dried powder at a ratio of 1:1–1:4, and casting a plurality of green sheets using a doctor blade process;

stacking a plurality of said green sheets, printing an inner Ag electrode upon the stacked sheets, stacking again a plurality of green sheets, and sintering the resulting body; and forming an outer electrode on the sintered body.

15. The method as claimed in claim 14, wherein said ferrite powder further comprises (in weight %): one compound or more selected from a group consisting of 2.0% or less of CoO, 2.0% or less of $Co_2O_3$ and 2.0% or less of $Co_3O_4$.

16. The method as claimed in claim 14, wherein said glass is composed of (in weight %): 10–40% of $B_2O_3$, 20–40% of $Bi_2O_3$ and 20–70% of ZnO.

17. The method as claimed in claim 16, wherein said glass has a particle size range of 0.1–10 μm.

18. The method as claimed in claim 17, wherein said glass has a particle size range of 0.2–5 μm.

19. The method as claimed in claim 14, wherein said powder is calcinated at a temperature of 650°–880° C.

20. The method as claimed in claim 14, wherein said sintering temperature is maintained for less than 5 hours.

21. The method as claimed in claim 20, wherein said sintering temperature is maintained for 1–3 hours.

22. The method as claimed in claim 21, wherein, during the sintering, a temperature raising is carried out through a temperature interval of 750°–900° C. at a rate of about 10° C./minute or less, and a cooling from 900° C. to 700° C. is carried out at a rate of about 5° C./minute or less.

23. The method as claimed in claim 14, wherein said binder is a mixture of PVB and mannitol.

* * * * *